May 23, 1933.  D. S. JACOBUS  1,910,438
PROCESS OF MAKING WELDED DRUM
Original Filed Jan. 25, 1928
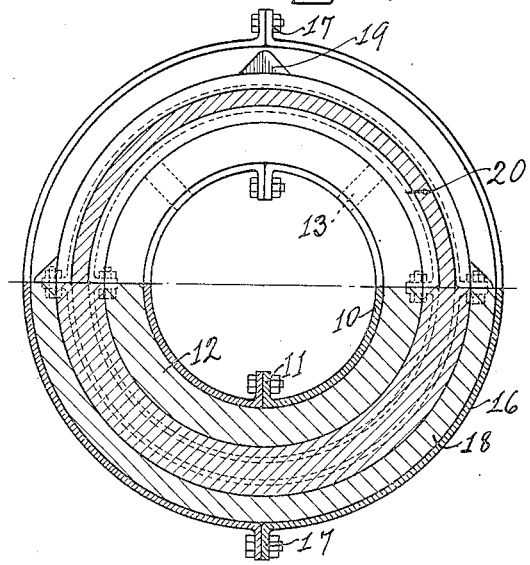
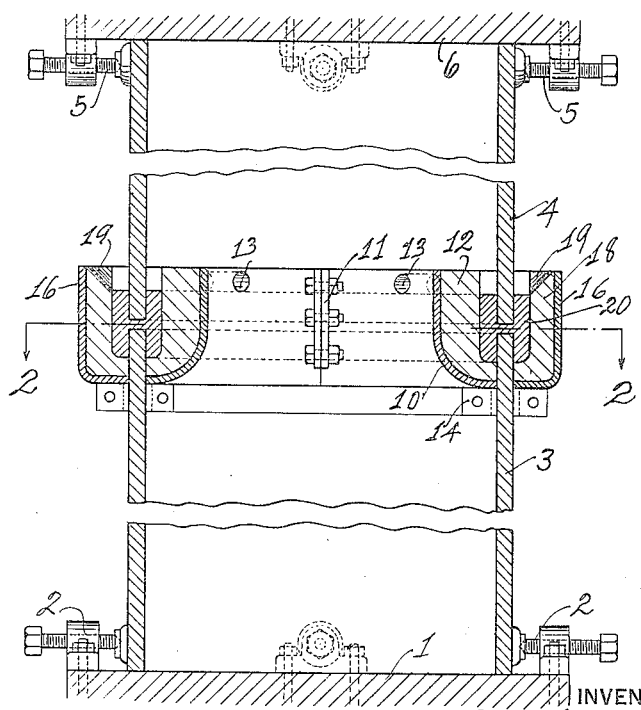

Patented May 23, 1933

1,910,438

UNITED STATES PATENT OFFICE

DAVID S. JACOBUS, OF MONTCLAIR, NEW JERSEY, ASSIGNOR TO THE BABCOCK & WILCOX COMPANY, OF BAYONNE, NEW JERSEY, A CORPORATION OF NEW JERSEY

PROCESS OF MAKING WELDED DRUM

Application filed January 25, 1928, Serial No. 249,371. Renewed May 10, 1932.

This invention relates to a process of making long drums, such as boiler drums, by welding together the ends of hollow sections. After the welding process the welded joints may be hammered or forged to strengthen the metal and make a smooth joint. The invention will be understood from the description in connection with the accompanying drawing in which Fig. 1 is a vertical section through an illustrative embodiment of the invention, and Fig. 2 is a section along the line 2—2 of Fig. 1.

In the drawing reference character 1 indicates a base that is provided with adjustable clamps 2 for a hollow drum section 3, the end of which is to be welded to the end of a corresponding section 4. The section 4 is held in alignment with the section 3 by means of adjustable clamps 5 that are attached to the head 6 of a press. The section 4 is disposed immediately above the section 3 and the sections can be placed in exact alignment and prevented from turning by means of the adjustable clamps 2 and 5.

An inner annular mold 10 is installed on the inside of the sections around the joint near adjacent ends of the sections 3 and 4. This mold is made in sections that are bolted together, as indicated at 11, so that the mold can be removed. The mold is lined on the inside with a refractory lining 12, leaving an open space around the ends of the sections 3 and 4. A series of outlets 13 is provided near the upper edge of the inside mold and a supporting ring 14 is provided on the inside of the section 3 below the mold to keep it in place. An outer annular mold 16 is provided on the outside of the joint opposite the inner mold and is also made in sections that are bolted together, as indicated at 17. The outer mold is provided with a refractory lining 18 with notches or gates 19 for introducing Thermit metal, a space corresponding to the inside space being left around the ends of the sections 3 and 4.

The operation is as follows: The section 3 is fastened in place by means of the clamps 2 with the axis of this section vertical. The inside mold 10 and the outside mold 16 are put in place near the upper end of the section 3. The section 4 held to the face of the press 6 by means of the clamps 5 is placed above the section 3 in alignment therewith. The ends of the sections are brought close together but a small space is left between the ends and the clamps are adjusted to bring the sections into exact alignment. Thermit metal 20 is poured into the mold preferably at several points on one side of the sections and flows through the space between the ends of the sections until it fills the space around these ends up to the overflow openings for the metal. Four openings 19 are shown in the outside mold for introducing the Thermit metal, and the inside mold is shown with overflow holes 13. The Thermit metal may, however, be introduced from the inside, in which case an opening would be provided through the face of the press for this purpose.

The inside of the molds may be dried out and the adjacent ends of the sections 3 and 4 may be heated by means of a gas flame, for example, before the Thermit metal is poured in, and an excess of Thermit metal is poured in and allowed to run off whenever this is necessary to supply the desired amount of heat for welding purposes.

After the ends of the sections 3 and 4 have been brought to a welding temperature, the face 6 of the press is moved downwardly to bring the ends into contact with each other and force the Thermit metal from between the ends. The ends thereupon become welded together, and the sections may be moved together a sufficient distance to upset the ends. The molds and the Thermit metal are then removed and the excess metal due to upsetting the ends may also be removed, or may be hammered or forged to make a smooth joint. The hammering or forging will, at the same time, convert the mass of autogenously welded material into a wrought iron structure, and also serve as an automatic test for the welded joint to reveal any defects if present.

I claim:

1. In the manufacture of a boiler drum from thick walled metallic sections, aligning adjacent sections, maintaining the sections in alignment with their adjacent ends out of contact, souring the section faces by flowing molten metal over their opposing faces, preheating the ends and excluding air from contact with the ends by maintaining them in a bath of molten metal until they are brought to a welding temperature, expelling excess metal of said bath and upsetting the opposing ends by forcing the sections toward each other through said metal with force sufficient to integrally unite the sections by a butt weld, and forging the metal at the juncture of the sections.

2. The process of welding adjacent parts which comprises placing their junction ends in spaced relationship, flowing molten metal across the opposing faces of said ends, providing a bath of said metal surrounding said ends and contacting with said opposing faces to heat the ends to welding temperature and to exclude air from contact therewith, moving said parts toward each other so that their adjacent ends pass through said bath to expel the molten metal between adjacent ends, continuing the pressure developed by such movement to integrally unite said ends, allowing the expelled metal of the bath to freeze, forging the juncture of said parts and removing the excess of metal from the parts.

3. In a method of welding metallic sections, maintaining the sections with their adjacent ends out of contact, flowing molten metal across their opposing faces, preheating said parts and excluding air from contact therewith by maintaining said ends in a body of molten metal until they are brought to a welding temperature, and expelling the molten metal by forcing the sections toward each other with force sufficient to thereafter integrally unite the sections.

4. In the manufacture of a body from metallic sections, maintaining the sections with their adjacent ends out of contact, flowing molten metal over their opposing faces and between the sections, preheating said parts and excluding air from contact with said faces by maintaining said ends in a body of molten weld metal until they are brought to a welding temperature, exerting pressure on the weld metal to form a homogeneous union of said sections, removing the adhering weld metal and finally finishing off the weld by forging action.

5. A welding process for joining metal sections, said process comprising the subjection of adjacent ends of said sections to the action of a molten metal bath to preheat said ends to a welding temperature, expelling the material of said bath from its position between the section ends by moving said ends into and through the bath, and then exerting pressure on said sections to unite their ends while they are surrounded on two sides by the bath and air is thereby excluded from contact with said ends, removing the adhering weld metal and finally finishing off the weld by forging action.

6. In the manufacture of pressure vessel equipment by joining thick walled metallic sections, aligning adjacent sections, maintaining the facing ends of the sections substantially spaced, flowing molten thermit weld metal along the faces of the ends, preheating the ends and excluding air from contact therewith by maintaining them in a bath of the molten metal until the metal of the ends is brought to a welding temperature, exerting pressure on the weld metal to cause it to flow, removing the excess weld metal, and forging the juncture of the adjacent ends of the sections to homogenize it.

7. The process of welding adjacent parts which comprises securing them with their junction ends in a spaced relationship, flowing molten aluminothermic welding metal across the opposing faces of said ends, providing a bath of said metal surrounding said ends and completely contacting with said opposing faces to exclude air therefrom, moving said parts toward each other so that their adjacent ends pass through said bath to expel the molten metal, continuing the pressure developed by such movement to unite said ends in a pressure weld, removing the excess weld metal and finishing the joint by forging.

DAVID S. JACOBUS.